United States Patent [19] [11] 3,693,100
Brown et al. [45] Sept. 19, 1972

[54] CUMULATIVE ENHANCEMENT SIGNAL PROCESSOR

[72] Inventors: Buck C. Brown, Rockville, Md. 20850; Charles D. Porterfield, Kensington, Md. 20795

[73] Assignee: Presearch Incorporated, Silver Springs, Md.

[22] Filed: April 9, 1971

[21] Appl. No.: 132,890

[52] U.S. Cl. ................................. 328/165, 328/151
[51] Int. Cl. ............................................. H03k 5/18
[58] Field of Search ........................... 328/151, 165

[56] References Cited

UNITED STATES PATENTS

| 3,531,802 | 9/1970 | Brown et al. | 328/151 |
| 3,201,702 | 8/1965 | Hanulec et al. | 328/110 |
| 2,736,021 | 2/1956 | Sunstein | 328/127 |

Primary Examiner—James W. Lawrence
Assistant Examiner—Harold A. Dixon
Attorney—Pennie, Edmonds, Morton, Taylor and Adams and John L. Sigalos

[57] ABSTRACT

A cumulative enhancement signal processor for improving the detection of repetitive signals in a noisy background which signals exist during each of a plurality of repetition intervals. Each repetition interval is divided into a plurality of discrete time intervals called bins. The average signal level in each bin is determined and the estimated mean background noise level for each bin is derived by summing and averaging the signal level in a selected number of bins adjoining the bins next to the test bin. The estimated mean background noise level for each bin is subtracted from the average signal level for the associated bin to derive a residual signal which is then stored. This procedure is repeated for a selected number of repetition intervals with the derived residual signals for each bin being added to the previously derived residual signal for that bin. Since the signal level of a bin containing the information pulse is statistically greater than the estimated mean background noise for that bin, the residual signals accumulate to a relatively high signal level as the repetitive information pulses are accumulated over a selected number of repetition intervals. The residual signal in bins not containing the repetitive information signal will not accumulate to a high residual signal over successive repetition intervals since the difference between the estimated mean background noise level for such bins and the average signal level thereof will tend to zero.

If the information signal is shifting timewise with respect to the repetition interval, a plurality of the aforementioned signal processors are connected in parallel with the discrete time intervals or bins generated by each processor being shifted with respect to time at varying rates. Thus, a high accumulation signal will occur in only the processor having its bins shifted at the same rate that the information signal is shifting with respect to the repetition interval. The output of the processor having the highest peak accumulated signal is detected and displayed by an output device.

11 Claims, 5 Drawing Figures

INVENTORS
BUCK C. BROWN &
CHARLES PORTERFIELD

INVENTORS
BUCK C. BROWN &
CHARLES PORTERFIELD

BY Pennie, Edmonds, Morton, Taylor & Adams
ATTORNEYS

CUMULATIVE ENHANCEMENT SIGNAL PROCESSOR

BACKGROUND OF THE INVENTION

This invention relates to a signal processor and more specifically to a signal processor for detecting repetitive information signals in a noisy background.

In the past signal processors for detecting repetitive signals such as sonar pulses have been less than adequate since the average background noise level from which an information signal is extracted, heretofore, has been difficult if not impossible to ascertain. Thus, in an ocean environment both random and systematic noise components have contributed to the composite background noise level. Systematic noise components can be attributed to, among other things, the ocean waves, ship movement, temperature gradients, etc. Such noise is difficult to predict at any point in time and no known devices that have attempted to extract an information pulse from such a noise background have been wholly successful.

An example of a prior art signal processor that attempted to derive the true mean background noise at each point in time during a repetition interval simply summed the background noise at each point in time during a repetition interval or period. This summation signal was divided by the period of the interval to give the average background noise for the interval. However, this method has proved to be inaccurate when the noise level varied greatly over a repetition interval.

It, therefore, is an object of this invention to provide a method and apparatus for deriving a more accurate estimate of the background noise at each interval of a multi-interval repetition cycle.

It is another object of this invention to provide an accurate method and apparatus for detecting and enhancing a cyclic information signal in a noisy background.

It is yet another object of this invention to provide an accurate method and apparatus for detecting and enhancing a cyclic information signal in a noisy background wherein the information signal is shifting with respect to a repetition interval.

SHORT STATEMENT OF THE INVENTION

Accordingly, this invention relates to a method and apparatus for detecting and enhancing repetitive information signals in a noisy background wherein the information signals exist during each of a plurality of repetition intervals.

Each repetition interval is divided into a plurality of discrete time intervals called bins. The estimated average noise level is determined and subtracted from the average composite signal level in each bin to provide a residual signal which tends to zero if no information signal is contained in the bins and which is some value other than zero if the information signal is contained in the bin. The estimated noise level for each bin is derived by determining the average value of the composite signals in a selected number of bins to each side of the bins adjoining the bin of interest. The residual signals from each bin are stored and added to the residual signals derived from the corresponding bin in the succeeding repetition intervals. The residual signal for the bin containing the information signal will tend to accumulate and become much greater than the residual signals from the other bins and, accordingly, the position of the information signal is not only detected but also enhanced.

For information signals that are shifting with respect to the repetition interval, a plurality of the aforementioned signal processors are connected in parallel with the discrete time intervals or bins of each being shifted with respect to the repetition interval at varying rates. A high accumulation signal will occur only in the processor having its bins shifted at the same rate that the information signals is shifting with respect to the repetition interval. The output of the processor having the highest peak accumulated signal is detected and displayed by an output device.

Other objects, advantages and features of this invention will become more fully apparent from the following detailed description, appended claims and accompanying drawings in which:

DETAILED DESCRIPTION OF THE PREFERRED EMBODIMENT

Figure 1:
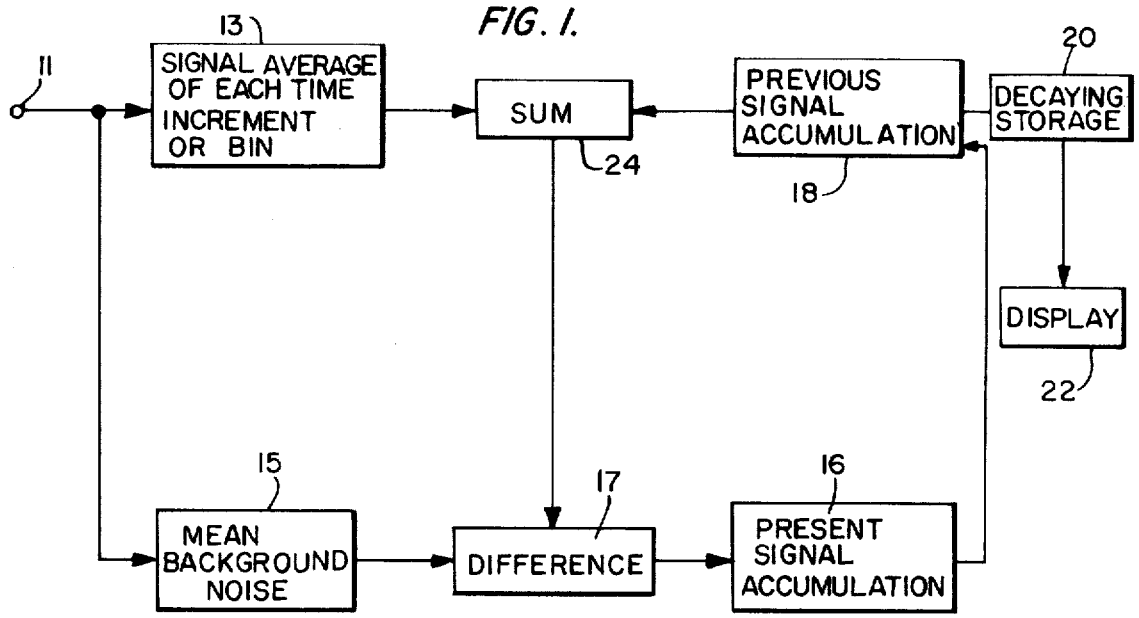
FIG. 1 is a simplified block diagram representing the functional operation of the invention.

With reference to FIG. 1, a signal input 11 is shown which may originate from a pulse radar, pulse-doppler radar or sonar system wherein the received signals are characterized as being repetitive and similar. The composite received signal from such systems is also characterized by a desired information signal component which exists briefly during the repetition interval, and a noise component which exists for the complete repetition interval; the noise component being comprised of random noise and systematic noise components. The input signal is divided into a plurality of time increments or bins and the average value of each of these increments is obtained at element 13. In addition, the average of the signal level in a selected number of bins to each side of the bins adjoining a bin of interest is derived in element 15. This derived average signal is the estimate of the mean background noise for the bin of interest. The average background noise level is derived for each bin in a repetition interval. This average background signal is subtracted from the signal average of the corresponding time bin for each time bin in difference circuit 17. The difference of the two averages, that is, the average of the energy received in each bin minus the average of the noise associated with each bin, is then stored in element 16. During the reception of succeeding input signals, the present signal accumulation is transferred to element 18. The accumulation signal in bin 18 is decayed or decreased over a number of repetition intervals to prevent an unduly large accumulated signal. This signal is then displayed by a display device 22.

The accumulation in element 18 becomes the previous signal accumulation as a new signal is fed to the processor and this signal is added bin by bin in element 24 to the new averages of the corresponding new bins at element 13. Thus, the system of FIG. 1 is a continuous or cumulative refinement loop which may be interrupted or recycled at any time by forcing the previous signal accumulation at 18 to zero.

Figure 2:
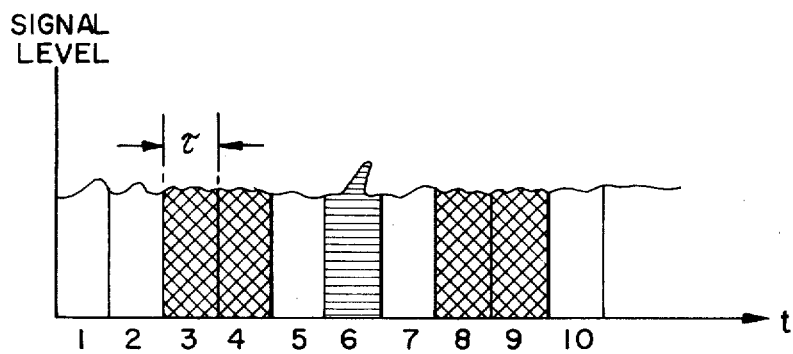
FIG. 2 is a graphical representation of a signal input to the processor after having been divided into discrete time intervals or bins.

FIG. 2 shows a graphical display of a typical input signal received by the processor of this invention. The incoming signal is divided into discrete time intervals or bins which may have any suitable time duration. In the preferred embodiment, the processor is used to enhance sonar pulses. Accordingly, the width or time duration of each bin is approximately equal to the duration of the sonar pulse plus a correction for target elongation. Typically for a pulse having a duration between 0.5 seconds and 1 second, the elongation factor will be 0.1 seconds. If the period between sonar pulses or pings is 50 seconds and the length of a sonar pulse is 1 second, the number of bins will be approximately 45 for a repetition interval.

In the past, the mean background noise level was determined by summing the average signal level in each bin and then dividing by the period of the repetition interval. The method of ascertaining background noise for each individual bin was prone to error as will be more fully understood from examination of FIGS. 3(a), 3(b), and 3(c).

Figure 3:
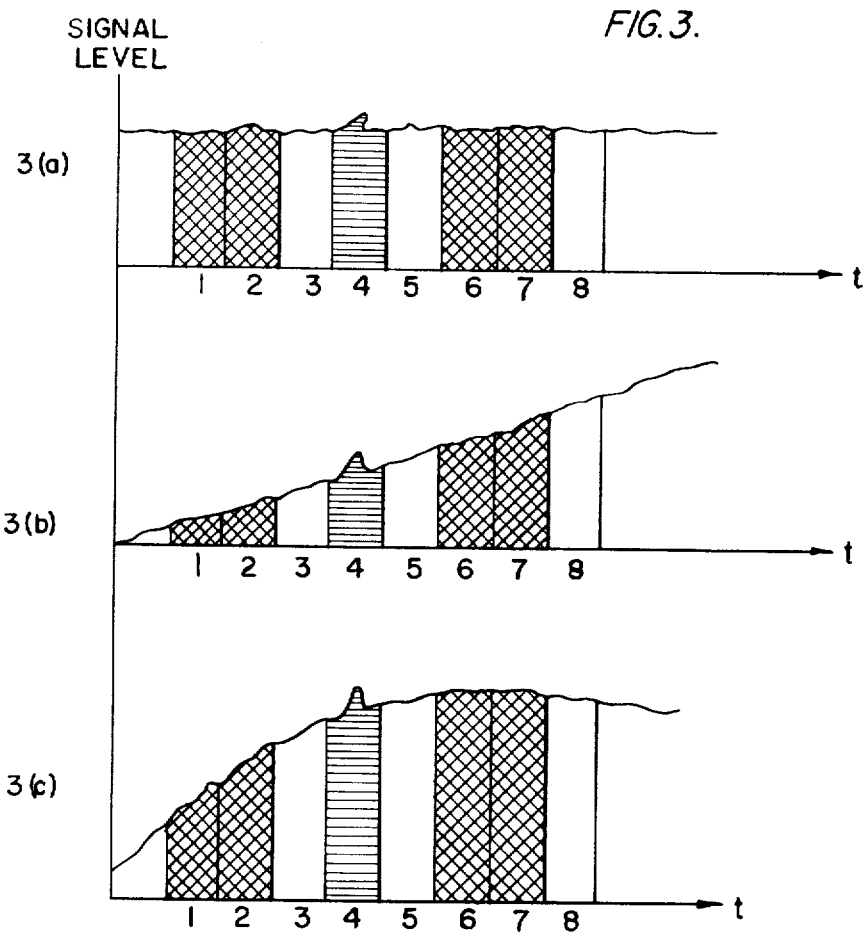
FIG. 3 shows a graphical representation of three kinds of background noise signals encountered by the processor of this invention.

FIG. 3(a) shows the signal level for a portion of a repetition interval when the background noise level is constant with time. For this case by using the aforementioned method of determining mean background noise, the correct average background noise for each bin is determined. However, the aforementioned method becomes subject to substantial error if the background noise varies with time as shown in FIGS. 3(b) and 3(c). Thus, in FIG. 3(b) the background noise is rising linearly with time. By determining the average noise level for a repetition interval, the noise level in the fourth bin may be accurate provided it is the center bin of the interval. If it is not the center bin, the calculated noise level will be either higher or lower than the actual background noise in the bin of interest. By this invention these errors are obviated. The signal in bins 1, 2, 6 and 7 are summed and then divided by ($1/4\tau$) which is the total time duration of these bins, to derive a mean background noise level for the fourth, the bin of interest. This is repeated for each bin in the repetition interval. It should be understood that the third and fifth bins could be included in the derivation of the mean background noise level but in the preferred embodiment these are not included to insure that a target signal that is not centered in a bin will not contribute to the estimate of the background for the bin in which it occurs. It also should be understood that the signal level of more or less than two bins to each side of the bin of interest can be summed to derive the estimated mean background noise level. However, by referring to FIG. 3(c) it will be apparent why only a few bins to each side of the bin of interest should be summed to derive an estimate of background noise for the bin or interest. The background noise in FIG. 3(c) varies non-linearly with time as shown. Thus, the background noise level is rising sharply for bins 1, 2 and 3 but levels off for the remaining bins. If a large number of bins to each side of bin 4, the bin of interest, are summed to derive a mean background level, the average noise level will approach the maximum noise level which is the level shown in bin 7. This error can be minimized by keeping the extremities of the background bins close to the bin of interest, i.e., by including only a few bins in the noise background determination and by keeping the spacing between the bin of interest and the nearest background bins at a minimum.

Figure 4:
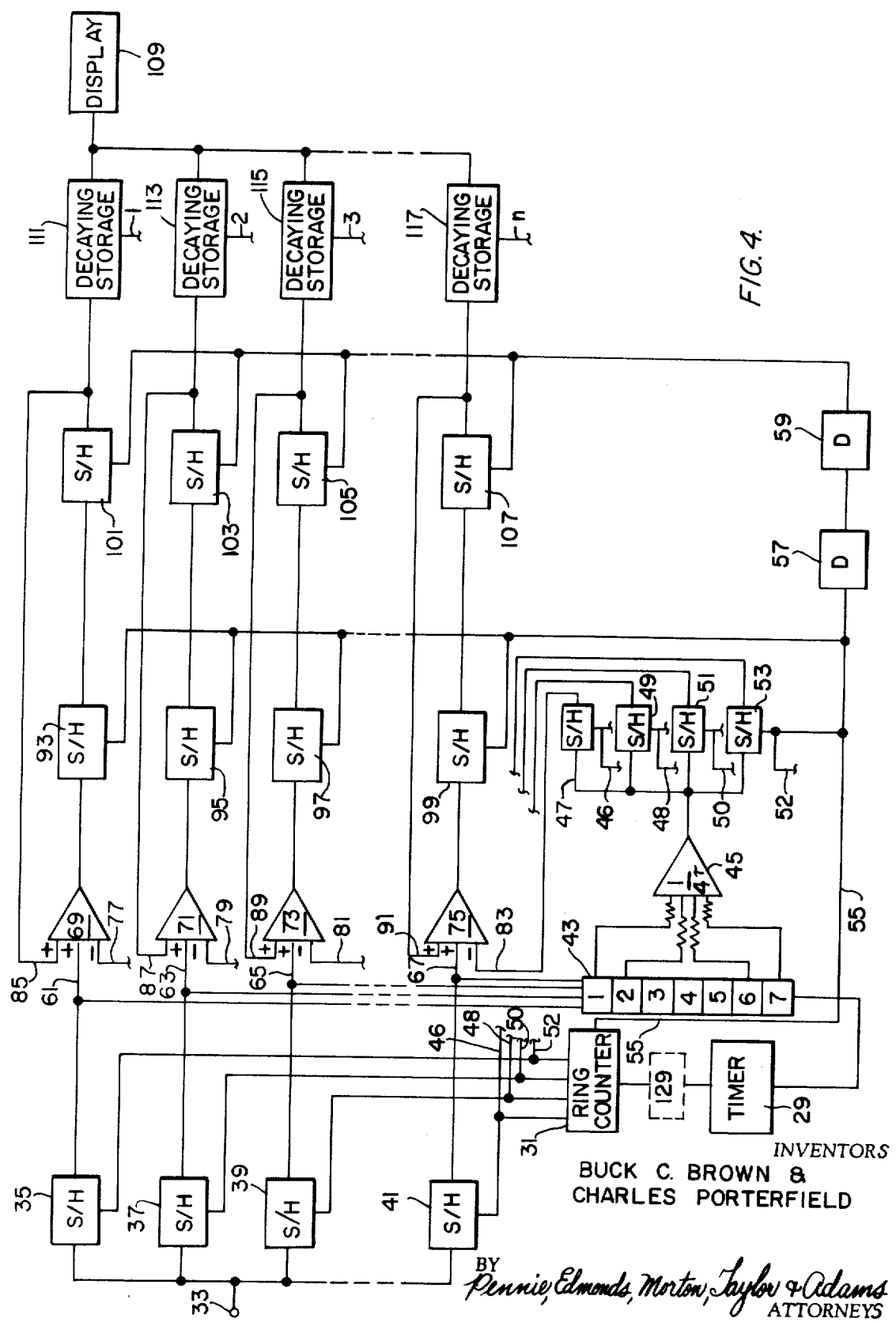
FIG. 4 shows a block diagram of the preferred embodiment of this invention.

Refer now to FIG. 4 which shows a block diagram of the preferred embodiment of the invention. The processor is provided with two inputs. A pulse timer 29 provides a series of short duration time pulses to ring counter 31 while the signal input to be detected enters at input 33. The ring counter includes a plurality of outputs from which are taken a total number, e.g., $n+1$, of time increment or bin signals. Simultaneously, the desired signal plus associated noise is applied to $n$ number of sample and hold circuits 35–41. Circuits of this nature are well-known in the art and are characterized in that the leading edge of a time increment pulse from the ring counter 31 immediately destroys all information which may be stored in the sample and hold unit. In addition, each sample and hold unit integrates the input signal for the duration of the pulse it receives from ring counter 31. This integral is then held by the sample and hold units until another time increment pulse is received from the ring counter 31. Thus, the input sample and hold circuits 35–41 are each utilized to obtain an integral value of a different bin of the input signal, there being $n$ discrete time increments or bins.

The output of each of the sample and hold circuits 35–41 are sequentially fed to a serial-parallel shift register 43. Thus, at the end of the first seven timing intervals, the output of the sample and hold unit 35 is in the seventh stage of shift register 43, the output of sample and hold circuit 37 in the sixth stage, etc. Once each timing interval the contents of the first, second, sixth, and seventh stages of the shift register are sensed by summing amplifier 45. The gain of amplifier 45 is ($1/4\tau$) or the total period of the four bins. The output of amplifier 45 represents the estimated mean background noise level of the bin of interest and is connected to a series of sample and hold circuits 47–53 each being associated with a corresponding bin of the detected input signal. Each sample and hold circuit in sequential order is pulsed by ring counter 31 along lines 46–52 as the background noise of its associated bin is being calculated by amplifier 45. Thus, sample and hold circuit 47 is pulsed when the mean background noise level for the first bin is being calculated. The output of the amplifier is then stored in that sample and hold circuit. It can be seen that each of the sample and hold circuits 47–53 store the respective mean background noise level signal for an associated bin of the input signal being detected.

At time $n+1$, each of the sample and hold circuits 47–53 are pulsed by ring counter 31. The ring counter pulse at time $n+1$, which is provided on output line 55, is delayed twice by delays 57 and 59 to provide additional data processing intervals. The first delayed interval provided by delay 57 enables the storing of current information while the second delay 59 enables the storing of information from the previous data gathering interval.

The outputs from sample and hold circuits 35–41 are added at the inputs 61–67 of operation amplifiers 69–75, respectively. The mean background noise signal for each bin as provided by the sample and hold circuits 47–53 is simultaneously subtracted at inputs 77–83 of operational amplifiers 69–75, respectively. At the same time, signals from the previous trace which have already been processed by the amplifiers 69–75 are added at amplifier inputs 85–91 of amplifiers 69–75, respectively. As a result, the outputs of the operational amplifiers 69–75 represent the average of the input signal for each time increment minus the estimated mean background noise level for the corresponding time increments plus the signals in each time increment which have accumulated from prior operations of the amplifiers 69–75. The outputs of these amplifiers are then stored in sample and hold circuits 93–99 and represent the results of current processing. The next set of sample and hold circuits 101–107 are driven by the second delayed n+1 pulse from ring counter 31 and are updated to current processing after the delay provided by delay 59. Thus, the sample and hold circuits 101–107 are updated to store the most recent accumulation of signals for each respective time increment upon the occurrence of each delayed n+1 pulse from ring counter 31, and these sample and hold circuits store the information for display and for successive processing by amplifiers 69–75, respectively.

One useful data presentation can be obtained by using a standard storage oscilloscope represented as display 109. The processed data present in sample and hold circuits 101–107 must be presented sequentially as a function of time in order to provide a useful display. Appropriate sequencing is obtained by commutating the outputs of sample and hold circuits 101–107 with gates 111–117, respectively, that are driven by ring counter 31. The gate outputs are connected in parallel and are coupled to the vertical input of display oscilloscope 109. If desired a decay storage circuit could be incorporated with the sample and hold circuits 101–107 so that the accumulated signals do not become excessively large.

Figure 5:
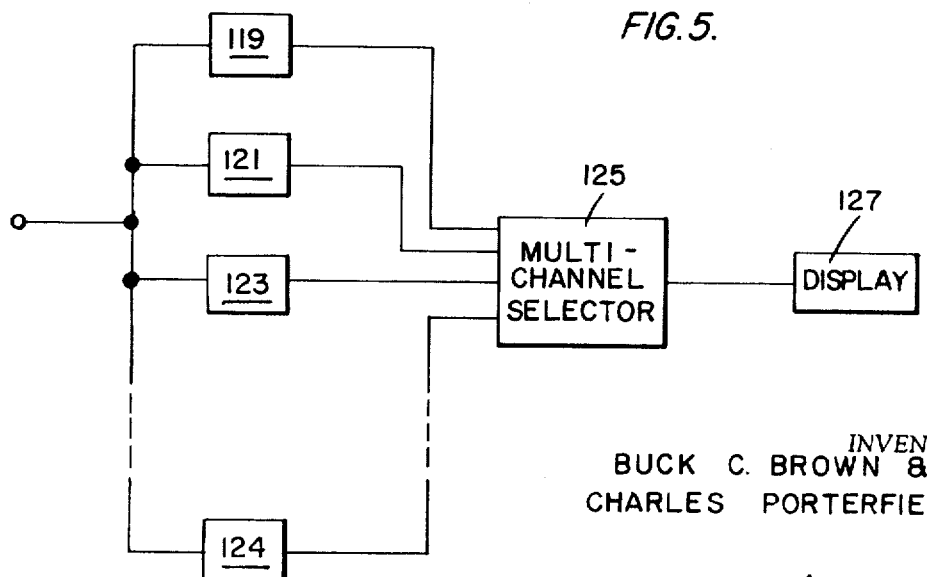
FIG. 5 shows a block diagram of the processor of this invention when an information signal is shifting with respect to a repetition interval

If the repetitious information signal is shifting with respect to the repetition interval as would happen, for example, if a moving ship or submarine was being detected by sonar, the aforementioned circuitry would not enhance the information signal since the information signal would not remain in the same time interval or bin. Such a shifting information signal can be detected and enhanced by the circuit of FIG. 5 which shows a plurality of the processor circuits 119–123 of FIG. 4 connected in parallel. However, each processor circuit 119–124 is modified from that shown in FIG. 4.

Thus, referring to FIG. 4, the phantom block 129 is a variable phase shift circuit that either delays or advances the delivery of timing pulses from timer 29 to ring counter 31. This has the effect of shifting the relative position of each bin generated by sample and hold circuits 35–41 either forward or backward in time. Thus, if the object being detected is approaching the sonar receiver, the timing pulses and hence the bins are advanced, and if the object being detected is receding from the sonar receiver, the timing pulses and hence the bins are delayed.

Since the rate of motion or range rate of the object being detected is usually an unknown, a plurality of processor circuits are combined in parallel with each having its timing pulses and hence its bins shifting at a different rate. Thus, for example, processor 119 may have its bins being shifted so that an information pulse returning from a ship approaching at 4 knots is accumulated in a signal bin. Processor 121 may have its bins being shifted so that an information pulse returning from a ship approaching at 2 knots is accumulated in a single bin. Processor 123 will not have its bins shifted at all so that it will accumulate return information pulses from stationary targets and finally, processor 124 may have its bins being shifted so that the return signal from an object receding at 2 knots will be accumulated. It should be understood that as many processor circuits can be connected in parallel as are necessary to cover the necessary or anticipated range rates.

Each of the outputs of the processors 119–124 are coupled to a multiple input comparator 125 which selects the processor having the greatest peak signal and gates this signal to an output display device 127 such as an oscilloscope. The processor having the highest accumulated signal in one of its bins will be the processor that is shifting its bins at the rate that the input information signal is shifting.

Although a specific analog embodiment of the invention has been described in detail, it should be understood that operational variations such as the number or placement of the basic time intervals may be produced by minor modifications to the ring counter 31 or to the input pulses from timer 29.

It is also necessary to determine and/or control the total number of traces used to provide each signal accumulation. This function can be accomplished by periodically manually or automatically resetting the output sample and hold circuits 101–107 to zero. It should also be understood that the basic functions of addition, subtraction, division and data storage required for the signal processing described above may be performed by digital as well as analog devices. Although digital circuitry is inherently reliable and stable, the required accuracy and resolution for the system described is obtainable with digital circuitry only with significantly increased cost and complexity. It is for this reason that an analog device is set forth as a preferred embodiment.

Thus, it should be understood that various modifications are contemplated and may obviously be resorted to by those of ordinary skill in the art without departing from the spirit and scope of the invention, as hereinafter defined by the appended claims.

We claim:

1. A cumulative enchancement signal processor for detecting and enhancing repetitive and similar information signals in a noisy background wherein the information signal exists for only a short time relative to complete repetitive interval and wherein the noise background exists for the complete repetitive interval, comprising means for dividing said input signals into a predetermined number of time increments;

means for determining the average signal level in each of said time intervals;

means for deriving the mean background noise for each time interval including means for summing the average signal level of a small number of time intervals relative to the total number of time intervals in each repetitive interval, said small number of time intervals being proximate the time interval for which the mean background noise is being determined;

means for averaging said summation signal over the time intervals summed to obtain a derived mean background noise level;

means for subtracting said average signal level for each of said time intervals from the derived mean background noise of the corresponding time intervals, said difference signals each being a residual signal of its associated time interval, and means for accumulating said residual signals of each time interval with the residual signals derived in the succeeding repetitive intervals wherein the residual signal of the time interval containing the information signal will become large compared to other intervals.

2. The processor of claim 1 wherein said means for summing the average signal level of a small number of time intervals relative to the total number of time intervals in each repetitive interval comprises means for summing the time intervals proximate the time intervals adjoining the time intervals for which the mean background noise is being derived, said adjoining time intervals being unsummed.

3. The processor of claim 2 further comprising means for decaying with time over a selected number of repetition intervals said accumulated residual signals.

4. The processor of claim 3 further comprising means for shifting said time intervals with respect to said repetition interval.

5. The processor of claim 4 further comprising means for shifting said time intervals with respect to said repetition interval at the same rate as said information signal is shifting with respect to said repetition interval.

6. The processor of claim 4 further comprising:

means for combining a plurality of said processors in parallel, each of said processors receiving said repetitive signal, and each of said processors shifting said time intervals at different rates; and means receiving the accumulated outputs of each of said processors for determining which processor provides the highest accumulation signal, said processor with said highest accumulation signal having a rate of interval shift approximately equal to the shift of said repetition signal with respect to said repetition interval.

7. In a cumulative enhancement signal processor, a method of detecting and enhancing repetitive and similar signals in a noisy background wherein the signals exist for only a short time relative to a complete repetition interval and wherein the noise component exist for the complete repetitive interval, comprising the steps of dividing said input signals into a predetermined number of time increments, determining the average signal level in each of said time intervals, deriving the mean background noise for each time interval including the step of summing the average signal level of a small number of time intervals relative to the total number of time intervals in each repetitive interval, said small number of time intervals being proximate the time interval for which the mean background noise is being derived, averaging said summation signal over the time intervals summed to obtain a derived mean background noise level, subtracting said average signal level of each of said time intervals from the derived mean background noise of the corresponding time interval, said difference signals each being a residual signal of its associated time interval, and accumulating said residual signals of each time interval with the residual signals derived in the succeeding repetitive intervals wherein the residual signal of the time interval containing the information signal will become large compared to other intervals.

8. The method of claim 7 wherein said summing step comprises the step of summing only the signal in those time intervals proximate the time intervals adjoining the time interval for which the mean background noise is being derived.

9. The method of claim 8 further comprising the step of decaying with time over a selected number of repetitious intervals said accumulated signals 10. The method of claim 9 further comprising the step of shifting said time intervals with respect to said repetition interval at the same rate as said information signal is shifting with respect to said repetition interval.

11. The method of claim 9 further comprising the steps of combining a plurality of said signal processors in parallel, shifting said time intervals at different rates in each processor, comparing the outputs of each of said processors, and detecting the output having the greatest peak accumulation signal.

* * * * *